D. J. KELLER & F. A. WATERS.
GEAR SHIFTING MECHANISM FOR MOTOR VEHICLES.
APPLICATION FILED SEPT. 25, 1916.

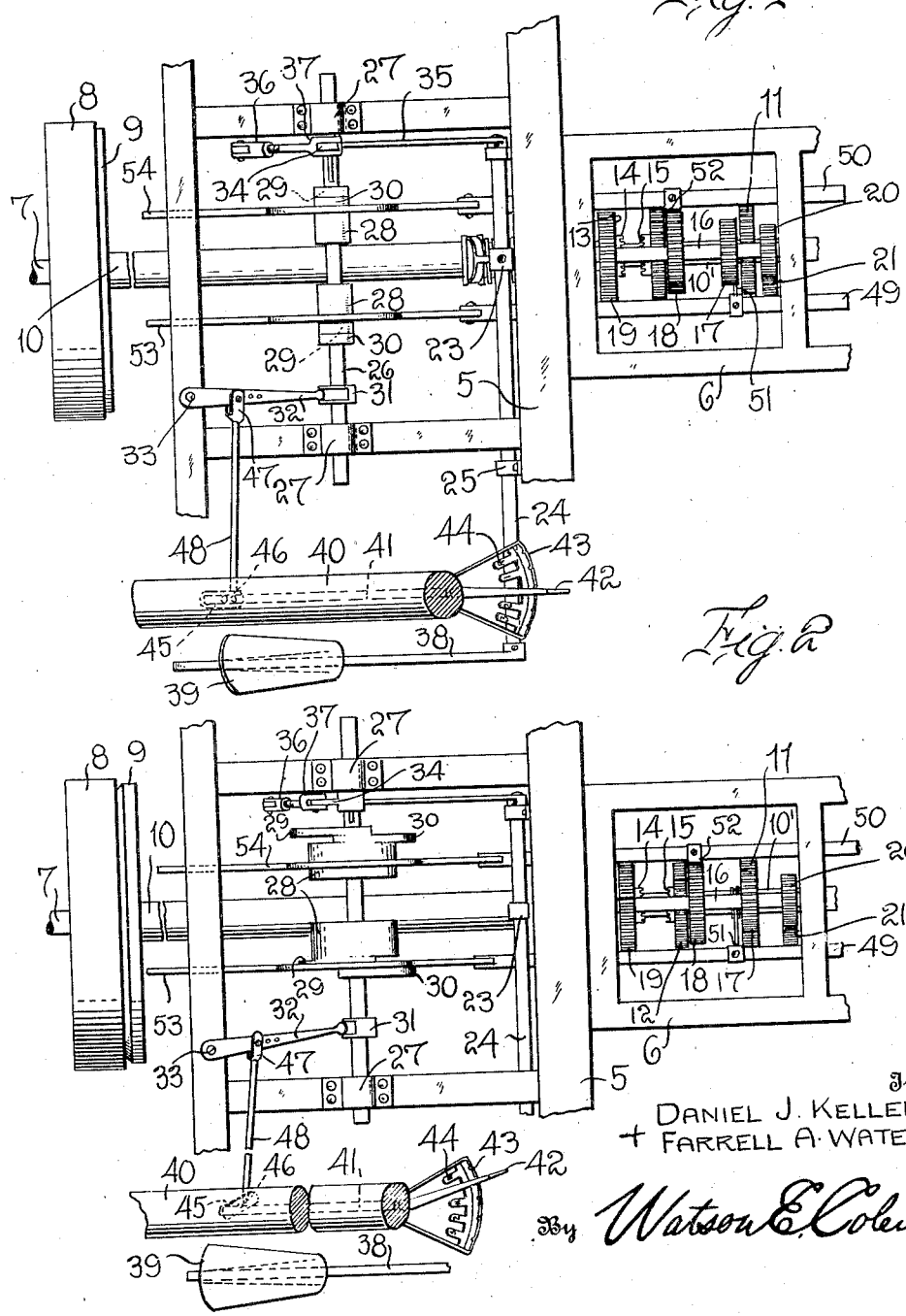

1,276,076.

Patented Aug. 20, 1918.
3 SHEETS—SHEET 2.

Inventors
DANIEL J. KELLER
FARRELL A. WATERS
By Watson E. Coleman
Attorney

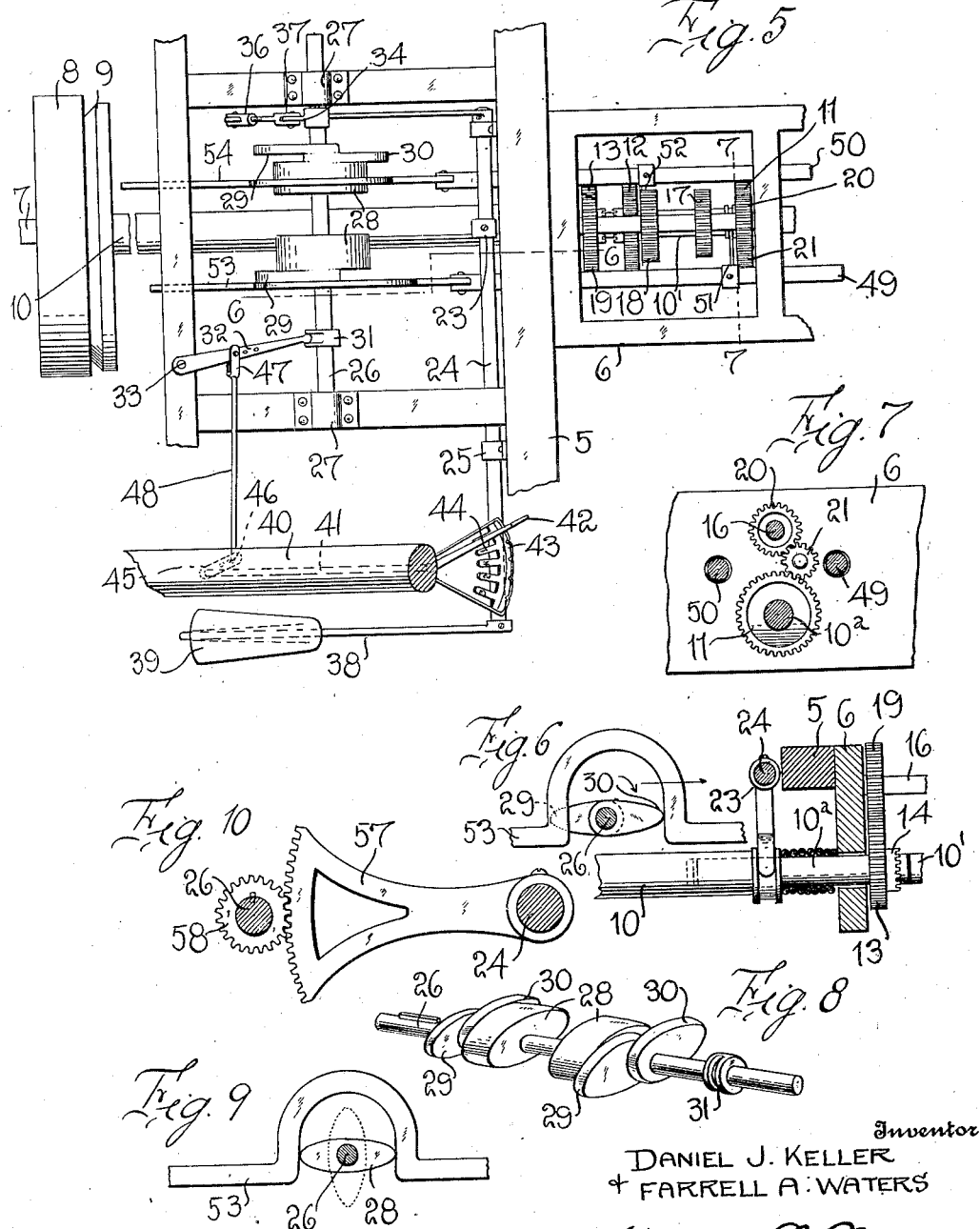

UNITED STATES PATENT OFFICE.

DANIEL J. KELLER AND FARRELL A. WATERS, OF MALDEN, MISSOURI; SAID WATERS ASSIGNOR OF ONE-SIXTH OF THE WHOLE RIGHT TO SAID KELLER.

GEAR-SHIFTING MECHANISM FOR MOTOR-VEHICLES.

1,276,076.   Specification of Letters Patent.   Patented Aug. 20, 1918.

Application filed September 25, 1916. Serial No. 122,108.

*To all whom it may concern:*

Be it known that we, DANIEL J. KELLER, and FARRELL A. WATERS, citizens of the United States, residing at Malden, in the county of Dunklin and State of Missouri, have invented certain new and useful Improvements in Gear-Shifting Mechanism for Motor-Vehicles, of which the following is a specification, reference being had to the accompanying drawings.

This invention relates to an improved gear shifting mechanism for motor vehicles and has for its primary object to provide simple and effective means for simultaneously shifting a plurality of gears and changing the driving speed or reversing the operation of the engine without necessitating the manipulation of a series of gear shifting levers.

It is another and more particular object of our invention to provide mechanism for the above purpose embodying a plurality of slidable gear shifting elements, actuating means therefor, and means for initially setting the actuating means to proper position for the desired shifting of the gears.

It is another important object of the invention to provide gear shifting means which will enable the operator to drive the vehicle upgrade on high speed, but to instantly reduce to intermediate or low driving speed if necessary.

The invention also has for a further general object to provide a very simple and compact arrangement of the several coöperating elements, whereby the mechanism is rendered highly positive and reliable in operation and capable of application to all sliding gear transmissions at comparatively small cost.

With the above and other objects in view, our invention consists in the novel features of construction, combination and arrangement of parts to be hereinafter more fully described, claimed and illustrated in the accompanying drawings, in which, Figure 1 is a plan view showing the gears in neutral position;

Fig. 2 is a similar view illustrating the relative positions of the parts when the gears have been shifted to drive at low speed;

Fig. 5 is a plan view with the gears in reverse;

Fig. 6 is a detail section taken on the line 6—6 of Fig. 5;

Fig. 7 is a section taken on the line 7—7 of Fig. 5;

Fig. 8 is a detail perspective view of the cam shaft showing the relative positions of the cams thereon;

Fig. 9 is a section taken on the line 9—9 of Fig. 1, showing the positions of the cams with respect to the slide bars when the gears are in neutral; and Fig. 10 is a detail view illustrating a slightly modified actuating connection between the pedal-operated rock shaft and the cam shaft.

Figure 3:
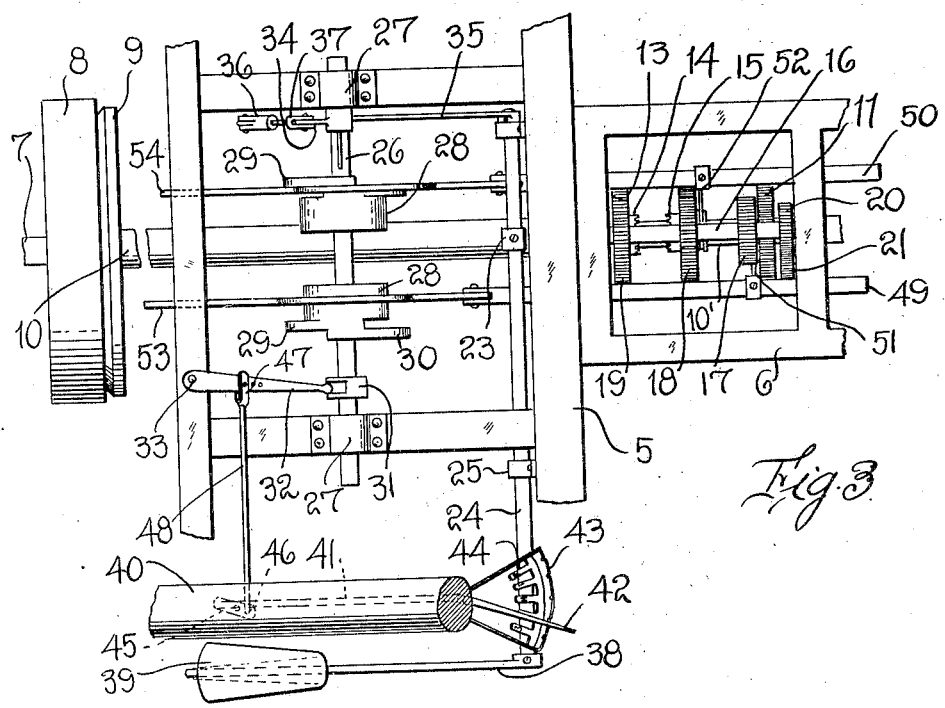
Fig. 3 is a similar view with the parts in position for driving at an intermediate speed.

In the accompanying drawings, we have illustrated a conventional type of sliding gear power transmission such as is commonly employed in motor vehicle construction. It will be understood, however, as the description proceeds, that the relative arrangement of the power transmission and driving shafts and the construction and mounting of the gears thereon is solely for the purposes of this explanation and that the invention, which resides primarily in the gear shifting mechanism, is applicable as well to various other transmissions of the sliding gear type.

In the accompanying drawings, 5 designates a suitable frame structure or support for the gear shifting mechanism, and 6 indicates the case or housing for the transmission gearing, the top of which has been removed. The engine shaft 7 is provided with a fly wheel 8 of the usual construction, having a clutch face to receive the clutch cone disk 9 fixed upon the end of the drive shaft 10 which has its rotative axis coincident with the axis of the engine shaft. In the illustrated embodiment of our invention, the driving shaft includes a shaft section 10' mounted in the transmission case 6, and upon this shaft section 10' the gears 11 and 12 are keyed for sliding movement. A shaft 10$^a$ is mounted in the transmission case in axial alinement with the shaft sections 10 and 10'. An additional gear 13 is fixed upon the shaft 10$^a$ and is provided with clutch teeth 14 for engagement by complementary clutch teeth 15 on the sliding gear 12. 16 designates the transmission shaft arranged in parallel relation to the driven shaft 10' which extends rearwardly to the differential mechanism and is connected thereto in the usual manner. The shaft 16 is equipped with spaced, fixed gears 17, 18 and 19 respectively, of relatively different ratios, the gear 19 having constant meshing engagement with the gear 13 on the shaft section 10ᵃ. An additional relatively small gear 20 is fixed upon the shaft 16 and is constantly engaged by a reversing gear or pinion 21 rotatably mounted upon one end wall of the transmission case. With this gear 21, the shiftable gear 11 is adapted to engage.

The main section of the driven shaft 10, which is equipped with the clutch 9, is yieldingly held against axial shifting movement with respect to the shaft section 10ᵃ by means of a coil spring 22 encircling the latter shaft. The rear end of the shaft section 10 is provided with a peripherally grooved collar to receive pins or studs on the arms of a yoke member 23 fixed upon a rock shaft 24 which is mounted in suitable bearings 25 on the frame structure. It will, of course, be understood that the shaft section 10 and shaft 10ᵃ are keyed or splined together in any desired manner for relative axial movement so that the section 10 may be shifted axially with respect to the section 10ᵃ.

Upon the spaced, longitudinal bars of the frame structure 5, a cam shaft 26 is journaled in the bearings 27. This shaft is provided with spaced cam multiples, each of which includes a relatively broad cam 28 and the oppositely projecting, narrow cam arms 29 and 30, the latter extending beyond the ends of the cam 28 on relatively opposite sides of the shaft 26. The shaft 26 and the spaced multiple cams are preferably in the form of one integral casting, and upon the shaft, in spaced relation to one of its ends, a peripherally grooved sector 31 is formed to receive one end of an arm or lever 32 fulcrumed as at 33, upon the frame 5. Upon the said shaft, adjacent to its opposite end, a collar having a radially projecting arm 34 is keyed. Upon the corresponding end of the rock shaft 24, a lever 35 is rigidly fixed at one of its ends and projects downwardly and forwardly beneath the shaft 26. The forward end of this lever has an interiorly threaded sleeve 36 pivoted thereon, and to the same one end of a link rod 37 has an adjustable threaded connection. The other end of this link rod is bifurcated and pivotally connected to the arm 34 on the shaft 26. To the opposite end of the rock shaft 24, one end of a pedal bar 38 is rigidly secured, the other end of said bar being provided with the usual foot plate 39.

Upon the steering post of the machine generally indicated by the numeral 40, spaced bearings are suitably secured to receive a longitudinally extending shaft 41, the upper end of which is angularly extended to provide a hand lever 42, said lever being movable over a fixed rack or quadrant 43 suitably mounted upon the steering post 40. Preferably, this quadrant is provided with spaced tongues or flanges indicated at 44 opposite the respective rack notches, and upon the same, reading from left to right, three driving speeds, as well as the neutral and reverse position of the shiftable gears, are indicated. The lower end of the shaft 41 has an arm 45 fixed thereto, and to said arm, as well as the pivoted arm or lever 32, interiorly threaded sleeves 46 and 47 respectively are pivotally connected, said arm and lever each being preferably provided with a number of pivot receiving openings so that the sleeves may be adjusted thereon. The sleeves 46 and 47 are connected by a rod 48 which may be readily adjusted at its ends in said sleeves. By means of this adjustable connection between the shaft 41 and lever 32, wear or lost motion between the several relatively movable parts may be compensated for. The connection 37 between the cam shaft and the lever 35 may also be readily adjusted to compensate for wear on the clutch cone 9.

Slidable rods 49 and 50 are mounted in the transmission gear case for longitudinal movement upon opposite sides of the gearing. The gear member 11 is provided upon one face with a grooved collar to receive the arms of a yoke, indicated at 51, which is secured to the shaft 49. The gear 12 is likewise provided with a grooved collar to receive the arms of a yoke member 52 fixed upon the shaft 50. To the forward end of each of the rods 49 and 50, the rear end of a slide bar 53 and 54 respectively, is pivotally connected. These slide bars are mounted in suitable guides at their forward ends and each of said bars, intermediate of its ends, is formed with an upwardly extending, inverted U-shaped yoke portion 55 and 56 respectively, between the spaced, vertical arms of which the respective multiple cams on the shaft 26 operate.

Figure 4:
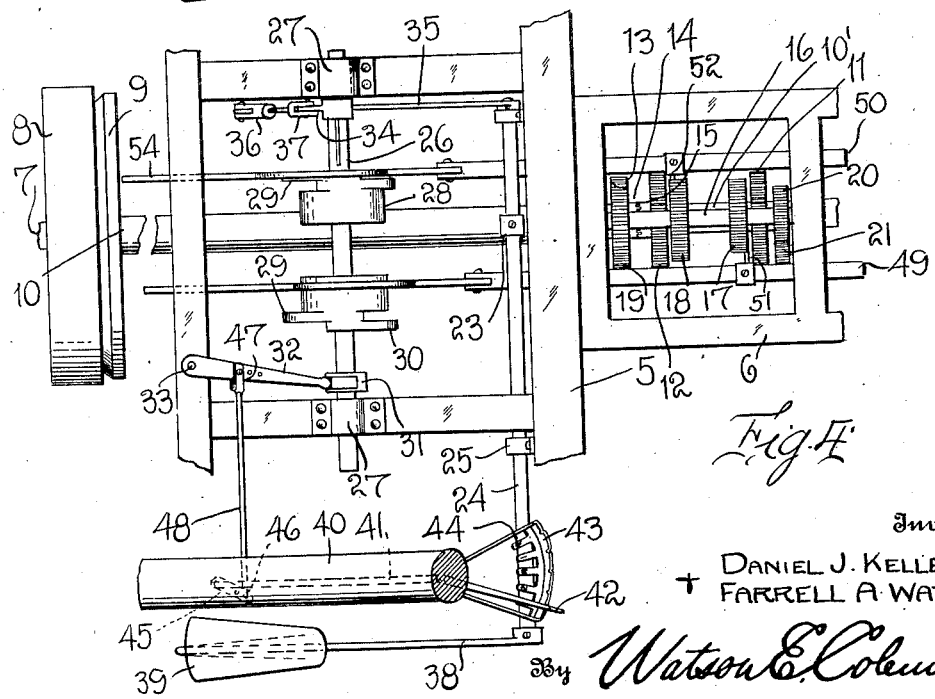
Fig. 4 is a plan view illustrating the positions of the parts when driving at high speed.

By referring now to Fig. 1 of the drawings wherein the several gear elements are set in neutral position, it will be observed that the longitudinal axes of the multiple cams are perpendicularly disposed and the several gear elements are out of mesh. In Fig. 2, the lever 42 has been shifted to place the multiple cams in position to actuate the shiftable gears for driving at low speed, and it will be observed that the cam 29 of one of the multiple cams is in alinement with the vertical arms of the corresponding yoke 55. The foot pedal is now depressed, whereby the shaft 24 is rocked and the cam shaft rotated through the medium of the connections 35 and 37, thus throwing the cam 29 downwardly to a horizontal position and engaging the same with the forward vertical arm of the yoke member, thus shifting the rod 49 forwardly and engaging the gear 11 with the relatively small gear 17 upon the shaft 16. In order to drive at an intermediate speed, the lever 42 is shifted to the position seen in Fig. 3 so that when the metal bar is again depressed, the cam 30 will engage with the slide bar 54 to shift the rod 50 rearwardly, thereby moving the gear 12 into meshing engagement with the gear 18 on the shaft 16. It is to be noted, however, that before these gears are engaged, the cam 28 of the other multiple gear first shifts the rod 49 rearwardly and disengages the gear 11 from the gear 17. Thus, the transmission of power from a lower to a higher speed gear does not occur until the lower speed gear has been disconnected. Upon shifting the lever 42 to the position seen in Fig. 4, the shaft 26 is axially shifted to position the cam 29 of one of the multiple cams in alinement with the slide bar 54 so that when the treadle bar is depressed, said cam engaging the slide bar shifts the rod 50 forwardly, disengaging the gear 12 from the gear 18 and engaging the clutch 15 on the gear 12 with the clutch 14 on the gear 13 so that the shaft section 10' will be positively driven through the shaft 10ª at the same speed as the shaft section 10. By now placing the lever 42 in the position shown in Fig. 1 and depressing the foot pedal, the several gears may be returned to neutral position. In Fig. 5, the multiple cams have been shifted into position to move the shiftable gears into reverse, and it will be noted that the cam 30 is in alinement with the slide bar 53 so that upon the rotation of the cam shaft, this bar is moved rearwardly to slide the rod 49 and thus move the gear 11 into reversing meshing engagement with the gear 21 which is engaged with the gear 20 on the shaft 16, thus reversing the transmission of power to the rear axle of the vehicle.

From the foregoing description, taken in connection with the accompanying drawings, it will be seen that we have produced a very simple, effective, and positively operating gear shifting mechanism wherein the driving speed may be instantly changed at the will of the operator, merely by the depression of a foot pedal. Thus, we have avoided the necessity of manipulating several levers and the possibility of changing from low to high speed while the low speed gears remain in mesh, in which event the teeth of the latter gears will be stripped and the mechanism possibly otherwise injured.

The mounting and arrangement of the multiple cams and the means for initially setting the same into proper coöperative relation to the respective slide bars, whereby the driving speed may be changed if desired, affords an absolutely positive and reliable actuating means for the shiftable gears and enables the operator to instantly change from high to low speed in case of emergency or, for instance, when ascending a grade and the engine is working under a heavy overload.

In Fig. 10 of the drawings, we have illustrated a slightly modified connection between the rock shaft and the cam shaft, wherein a gear segment 57 is fixed upon the rock shaft and meshes with a gear 58 secured upon the cam shaft. This operating connection is simple, reliable and effective and may be employed in lieu of that first described if desired. It is manifest that various other operating connections might also be devised for the purpose of actuating the cam shaft so that the gears will be properly shifted to establish the desired driving connection. It is to be noted that in each depression of the foot pedal and shifting of the gears, the cone clutch 9 is disengaged from the fly wheel so that the positive transmission of power to the driven shaft is momentarily interrupted while the change in speed is being made. The rotation of the shaft 26 and the cams thereon takes place at the same time as the initial movement of the clutch. It will be observed that the cam arms 29 and 30 do not operatively engage the slide yokes in the initial rotation of the shaft 29, but there is sufficient lapse of time between the initial rotation of the cam shaft and the operative engagement of the cam arms with the yokes to insure the complete disconnection of the driven shaft from the driving shaft by the initial depression of the clutch pedal. Thus, the shifting of the gears is accomplished without lost motion in the operating connections between the clutch shaft and the cam shaft, and with a comparatively small amount of movement of the clutch pedal.

We have herein specifically referred to a certain form and construction of the cams and the slidable bars actuated thereby, but it is to be understood that these elements, in their form and proportions, may be altered or changed as special circumstances might require. The various other coöperating parts of the mechanism are likewise susceptible of considerable modification and we, therefore, reserve the privilege of adopting all such legitimate changes as may be fairly embodied within the spirit and scope of the invention as claimed.

Having thus fully described our invention, what we desire to claim and secure by Letters Patent is:—

1. In combination with power transmission mechanism having a plurality of power transmitting members for establishing a plurality of driving relations, a power shaft and a driven shaft clutched thereto, means for simultaneously moving all of the power transmitting members to dispose the same in predetermined positions, said means having an initial inoperative movement, clutch actuating means, and means operatively connecting the clutch actuating means to said first named means to operate the latter concurrently with the disconnection of the driven shaft from the power shaft, and subsequently actuate the power transmitting members.

2. In combination with a power transmission mechanism having a plurality of power transmitting members, axially and rotatably movable elements associated with the respective individual power transmitting members to move said members to operative or inoperative positions, manually operable means for first shifting said elements axially to predetermined positions, said mechanism including a power shaft, a driven shaft clutched thereto, pedal operated means to disconnect the driven shaft from the power shaft, and an operative connection between said pedal operated means and said elements to simultaneously rotate the latter in the initial depression of the clutch pedal, said elements operating in the subsequent depression of the pedal to move the power transmitting member and establish a new driving relation.

3. In combination with a sliding gear transmission having shiftable gears for establishing a plurality of driving relations, a power shaft and a driven shaft clutched thereto, pedal operated means for disconnecting the driven shaft from the power shaft, a slide connected to each of the shiftable gears, a rotary member associated with each slide, means for axially shifting said members independently of the pedal operated means to dispose said members in predetermined positions with relation to the respective slides, and an operative connection between said members and the pedal operated means, whereby said members are operated simultaneously with the disconnection of the driven shaft from the power shaft, portions of said members co-acting with the respective slides to shift the gears and establish the desired driving relation, said members returning to their normal positions upon the release of the pedal operated means independently of the slides.

4. The combination with power transmission mechanism having a plurality of power transmitting members for establishing a plurality of driving relations, means associated with each of the power transmitting members for moving the respective members to driving or neutral position, means for adjusting said first named means to predetermined operative positions, and additional means to subsequently actuate said first named means and simultaneously shift the power transmitting members to establish a desired driving relation.

5. The combination with a sliding gear transmission comprising gearing for establishing a plurality of driving relations, means for shifting the gears to establish any of said relations including slides connected to the respective gears, spaced cam multiples to co-act with the respective slides, and means for simultaneously actuating the cam multiples to shift the gear slides and establish the desired driving relation.

6. The combination with a sliding gear transmission comprising gearing for establishing a plurality of driving relations, means for shifting the gears to establish any of said relations including slides connected to the respective gears, spaced cam multiples to co-act with the respective slides, means for simultaneously shifting the respective cam multiples to position said multiples at the same time in operative relation to the gear slides, and means for actuating the cam multiples to shift the gear slides and establish the desired driving relation.

7. The combination with a sliding gear transmission comprising gearing for establishing a plurality of driving relations, means for shifting the gears to establish any of said relations including slides connected to the respective gears, spaced cam multiples to co-act with the respective slides, the rotative axes of said multiples being disposed at right angles to the slides, means for simultaneously shifting the cam multiples axially to position said multiples at the same time in operative relation to the slides, and means for actuating the cam multiples to shift the gear slides and establish the desired driving relation.

8. The combination with a sliding gear transmission comprising shiftable gears for establishing a plurality of driving relations, slides connected to said gears, a cam shaft disposed at right angles to the slides, spaced cam multiples on said shaft, said slides each having means with which the respective cam multiples co-act, manually operable means to axially shift said shaft and position the cam multiples at the same time in operative relation to the slides, and additional means for rotating the cam shaft whereby the slides are actuated and the gears shifted to establish the desired driving relation.

9. In combination with a sliding gear transmission having shiftable gears for establishing a plurality of driving relations, means for shifting the gears including an adjustable element for shifting each gear to its effective driving position or to a neutral position, manually operable means for adjusting said elements to dispose portions of the respective elements in operative positions, and means for actuating said elements to shift the gears and establish the desired driving relation.

10. In combination with a sliding gear transmission having shiftable gears for establishing a plurality of driving relations, a power shaft and a driven shaft clutched thereto, slides connected to the shiftable gears, means associated with each of the slides to shift the gears to neutral or driving position, manually operable means for positioning said latter means relative to the respective slides, and pedal-operated means for operating said slide shifting means to establish the desired driving relation and at the same time disconnect the driven shaft from the power shaft.

11. In combination with a sliding gear transmission having shiftable gears for establishing a plurality of driving relations, a power shaft and a driven shaft clutched thereto, slides connected to the shiftable gears, rotary cams means associated with each of the slides, means for positioning said cam means with respect to the slides, and pedal-operated means for rotating the cam means to shift the gears and establish the desired driving relation and also simultaneously disengage the driven shaft from the power shaft.

12. The combination with a sliding gear transmission having shiftable gears for establishing a plurality of driving relations, a power shaft and a driven shaft clutched thereto, manually operable means to disconnect the driven shaft from the power shaft, a slide connected to each of the shiftable gears, spaced rotary members each having a plurality of laterally spaced cam portions to co-act with the respective slides, means for axially shifting said members at the same time to position one of their cam portions in operative relation to the respective slides, and an operative connection between said rotary members and the manually operable means, whereby said members are rotated to engage the cam portions thereof with the slides and shift the gears simultaneously with the disconnection of the driven shaft from the power shaft.

13. In combination with a sliding gear transmission having shiftable gears for establishing a plurality of driving relations, a slide connected to each of the shiftable gears, spaced members having a common rotary axis and each provided with cam portions disposed in different rotary planes to co-act with the respective slides, means for axially shifting said members as a unit to position certain of the cam portions thereof at the same time in operative relation with the associated slide, and means for rotating said members to shift the gears and establish the desired driving relation.

14. In combinatiton with a sliding gear transmission having shiftable gears for establishing a plurality of driving relations, a slide connected to each of the shiftable gears, spaced members having a common rotary axis and each provided with cam portions disposed in different rotary planes to co-act with the respective slides, means for axially shifting said members as a unit to position certain of the cam portions thereof at the same time in operative relation with the associated slide, the cam portions of said members being so related with respect to the rotary axis that the low speed gear is first shifted to a neutral position before the high speed gear is disposed in effective driving position in a single actuation of said members, and means for rotating said members to shift the gears and establish the desired driving relation.

15. In combination with a sliding gear transmission having shiftable gears for establishing a plurality of driving relations, a member operatively connected to each gear and having all portions thereof disposed in a single vertical plane, manually operable means to coact with each of said members, means for disposing said latter means in predetermined positions with relation to said members, and means for subsequently actuating the manually operable means to shift the gears and establish the desired driving relation.

16. In combination with a power transmission mechanism having a plurality of power transmitting gears, a slide operatively connected to each gear and having a single yoke formed therein, means to coact with the yoke of each slide, means for adjusting said coacting means to dispose the latter in predetermined positions with relation to the respective slides, and means for actuating the yoke engaging means to subsequently shift the gears and establish the desired driving relation.

17. In combination with power transmission mechanism having a plurality of shiftable gears, a slide operatively connected to each gear and having a yoke formed therein disposed in the vertical plane of said slide, a rotary member coöperatively associated with each of the yokes and having a plurality of projecting portions to coact with the yoke, manually operable means to dispose any one of the projecting portions of the respective rotary members in operative relation to the yoke, and means for subsequently rotating said members to shift the gears and establish the desired driving relation.

18. In combination with a power transmission mechanism having a plurality of shiftable gears, a slide operatively connected to each gear and having a single yoke formed therein, spaced cam sets operatively associated with the respective yokes, means for axially shifting the cam sets to dispose any one of the cams in each set in coacting relation to the associated yoke, and means for subsequently rotating said cam sets to shift the gears and establish the desired driving relation.

In testimony whereof we hereunto affix our signatures in the presence of two witnesses.

DANIEL J. KELLER.
FARRELL A. WATERS.

Witnesses:
M. C. LYDDANE,
A. I. HIND.